(12) United States Patent
Dieckmann et al.

(10) Patent No.: US 12,094,219 B2
(45) Date of Patent: Sep. 17, 2024

(54) METHOD FOR INSPECTING A VEHICLE, AND INSPECTION SYSTEM

(71) Applicant: ZF CV SYSTEMS GLOBAL GMBH, Bern (CH)

(72) Inventors: Thomas Dieckmann, Pattensen (DE); Janik Ricke, Uetze (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 18/572,804

(22) PCT Filed: Jun. 3, 2022

(86) PCT No.: PCT/EP2022/065177
§ 371 (c)(1),
(2) Date: Dec. 21, 2023

(87) PCT Pub. No.: WO2022/268480
PCT Pub. Date: Dec. 29, 2022

(65) Prior Publication Data
US 2024/0265711 A1 Aug. 8, 2024

(30) Foreign Application Priority Data

Jun. 22, 2021 (DE) ...................... 10 2021 116 068.5

(51) Int. Cl.
*G06V 20/58* (2022.01)
*B60T 7/16* (2006.01)
(Continued)

(52) U.S. Cl.
CPC ................ *G06V 20/58* (2022.01); *B60T 7/16* (2013.01); *B60W 10/182* (2013.01); *G05D 1/43* (2024.01); *B60W 2710/186* (2013.01)

(58) Field of Classification Search
CPC ........ G06V 20/58; B60T 7/16; B60W 10/182; B60W 2710/186; G05D 1/43
See application file for complete search history.

(56) References Cited

U.S. PATENT DOCUMENTS 10,497,108 B1 12/2019 Knuffman et al.
10,825,097 B1 11/2020 Knuffman et al.
(Continued)

FOREIGN PATENT DOCUMENTS

DE 102016212526 A1 1/2018
DE 102017115582 A1 1/2019
(Continued)

*Primary Examiner* — Bobbak Safaipour
(74) *Attorney, Agent, or Firm* — LEYDIG, VOIT & MAYER, LTD.

(57) ABSTRACT

A method for inspecting a vehicle on a site with a management system, including determining whether at least one vehicle on the site intends to make a departure from a stoppage place, generating a control command by the management system, and transmitting the control command to the inspection vehicle such that the inspection vehicle moves along an inspection path to the stoppage place. The method further includes detecting an environment around the inspection vehicle at the stoppage place by the sensor system while a detection zone of the at least one sensor is oriented at least in some regions at a subregion beneath the vehicle and/or at the vehicle. The method further includes determining, in dependence on the sensor signals generated by the sensor system, whether there is an impediment by which the departure of the vehicle is impeded, in order to carry out a pre-departure check.

27 Claims, 3 Drawing Sheets

(51) Int. Cl.
*B60W 10/18* (2012.01)
*G05D 1/43* (2024.01)

(56) References Cited

U.S. PATENT DOCUMENTS

| | | |
|---|---|---|
| 2006/0170768 A1 | 8/2006 | Riley |
| 2008/0211914 A1 | 9/2008 | Herrera et al. |
| 2010/0238290 A1 | 9/2010 | Riley et al. |
| 2015/0145999 A1* | 5/2015 | Kim ...................... G01M 17/00 |
| | | 348/148 |
| 2018/0096541 A1 | 4/2018 | O'Brien et al. |
| 2019/0266715 A1 | 8/2019 | Myers et al. |
| 2019/0304099 A1 | 10/2019 | Hever et al. |
| 2019/0304100 A1 | 10/2019 | Hever et al. |
| 2019/0329608 A1 | 10/2019 | Fraiss et al. |
| 2022/0415100 A1* | 12/2022 | Hartmann ............. G07C 5/0808 |
| 2024/0075918 A1* | 3/2024 | van Thiel ................ B60T 13/36 |

FOREIGN PATENT DOCUMENTS

| | | |
|---|---|---|
| DE | 102020001198 A1 | 10/2020 |
| DE | 102020007456 A1 | 2/2021 |
| DE | 102019133172 A1 | 6/2021 |
| WO | WO 2006059998 A1 | 6/2006 |
| WO | WO 2019026321 A1 | 2/2019 |

\* cited by examiner

METHOD FOR INSPECTING A VEHICLE, AND INSPECTION SYSTEM

CROSS REFERENCE TO RELATED APPLICATIONS

This application is a U.S. National Phase application under 35 U.S.C. § 371 of International Application No. PCT/EP2022/065177, filed on Jun. 3, 2022, and claims benefit to German Patent Application No. DE 10 2021 116 068.5, filed on Jun. 22, 2021. The International Application was published in German on Dec. 29, 2022 as WO 2022/268480 A1 under PCT Article 21(2).

FIELD

The invention relates to a method for inspecting a vehicle on a site with a management system, and to an inspection system for carrying out the method.

BACKGROUND

As in all vehicles, in particular commercial vehicles, a pre-departure check must also be carried out in the case of autonomously operated vehicles. In such a check, a checklist containing certain functions of the vehicle which are to be checked for correct functioning prior to each departure is completed, but it is also checked whether the vehicle can safely drive off, that is to say that there are, for example, no people or objects on or beneath the vehicle. Because a driver, or checker, is not always available for such a check in the case of autonomous vehicles, use is made, for example, of the existing vehicle environment sensor system of the autonomous vehicle, but also of externally installed sensors of a check apparatus, as described, for example, in DE 10 2020 007 456 A1. A check can thus be carried out in a corresponding manner. A pre-departure check which is carried out by way of the vehicle environment sensor system can, however, also be used in the case of manually operated vehicles.

However, there are places in which it is difficult to detect the environment for checking, for example beneath the vehicle, for example in the case of a long vehicle combination. Although it has been proposed to mount cameras or sensors beneath the vehicle too, as described, for example, in DE 10 2017 115 582 A1 and DE 10 2020 001 198 A1, these must then be cleaned very frequently because of the increased susceptibility to dirt. In addition, even with two cameras it is possible to detect the entire subregion of the vehicle, for example of a vehicle combination, only with difficulty, because those two cameras are rigidly mounted on the vehicle structure.

Also known are stationary systems for determining the state of a vehicle from beneath, as described, for example, in WO 06/059998 A1, US 2006170768 A1, US 2008211914 A1, US 2010238290 A1, US 2019304099A1 or US 2019304100 A1. To this end, the driver drives his vehicle over a sensor system, for example. The sensors present therein record high-resolution images of the underbody and evaluate the state of, for example, the underbody, the exhaust, the ball joints or the bumpers by means of software or an algorithm. The disadvantage of this method is that the vehicle must already be or have been driven in order that the underbody can be detected. However, within the context of the pre-departure check, it must be determined whether there is anything beneath the vehicle even before the vehicle is driven.

The prior art further discloses methods in which an inspection of a vehicle can be carried out by a drone, as described, for example, in US 2019266715 A1 or U.S. Ser. No. 10/825,097 B. To this end, a flying drone flies around the vehicle and detects scratches and dents, wherein the drone is also able to fly or travel under the vehicle. An application for a pre-departure check is not provided here, but merely an inspection of the tires, of the underbody or of the exhaust system. Furthermore, operation of a drone is associated with a high energy consumption, because the drone must permanently be kept in the air. The period of time for which such a drone can be used without charging is therefore limited.

SUMMARY

In an embodiment, the present disclosure provides a method for inspecting a vehicle on a site with a management system, wherein the management system is configured to coordinate vehicles on the site by at least one management function, wherein the management system is further configured to control an inspection vehicle, wherein the inspection vehicle has a sensor system having at least one sensor for outputting sensor signals in dependence on an environment detected by the at least one sensor. The method comprises determining whether at least one vehicle on the site intends to make a departure from a stoppage place and generating at least one control command by the management system and transmitting the at least one control command to the inspection vehicle such that the inspection vehicle moves along an inspection path to the stoppage place of the vehicle that intends to make the departure. The method further comprises detecting an environment around the inspection vehicle at the stoppage place of the vehicle by the sensor system in the inspection vehicle while a detection zone of the at least one sensor is oriented at least in some regions at a subregion beneath the vehicle and/or at the vehicle. The method further comprises determining, in dependence on the sensor signals generated by the sensor system, whether there is an impediment by which the departure of the vehicle is impeded, in order to carry out a pre-departure check.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
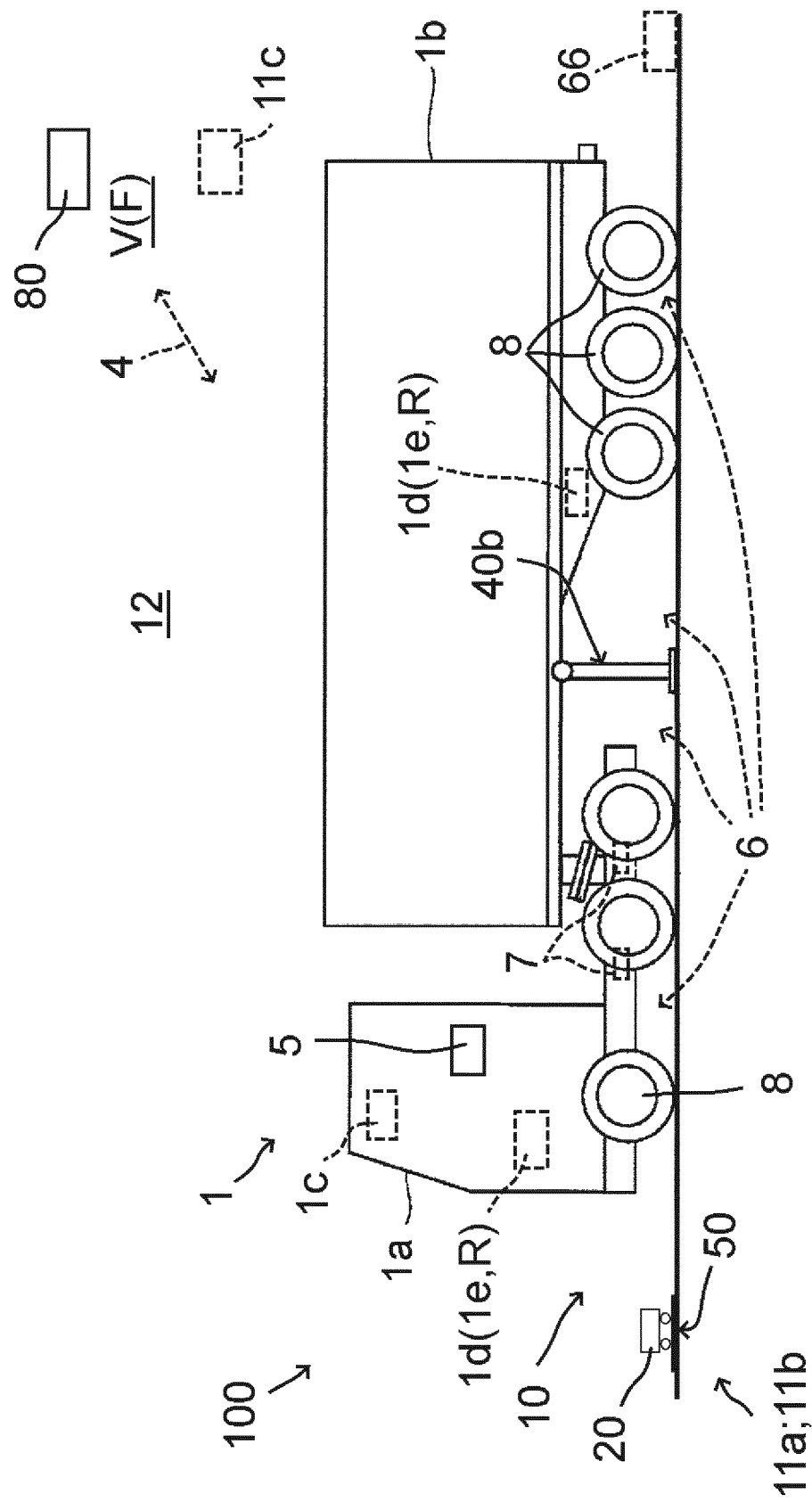
FIG. 1 illustrates a schematic view of a vehicle on a site with a management system.

In an embodiment, the present invention provides a method for inspecting a vehicle on a site with a management system, which method, with simple means and without modification of the vehicle to be checked, permits a reliable assessment of whether a vehicle is or is not impeded from making a departure. An embodiment further provides a corresponding inspection system.

There is thus provided according to an embodiment of the invention a method for inspecting a vehicle on a site (e.g. port area, car park, filling station, depot) with a management system, preferably within the context of a pre-departure check, wherein the management system is configured to coordinate, that is to say to control and/or to monitor and/or to give commands to, vehicles on the site by means of at least one management function, wherein the management system is further configured to control an inspection vehicle, preferably wirelessly, wherein the inspection vehicle has a sensor system having at least one sensor for outputting sensor signals in dependence on an environment detected by the at least one sensor, which method has at least the following steps:
- determining whether at least one vehicle on the site intends to make a departure from a stoppage place;
- generating at least one control command by the management system and transmitting the at least one control command to the inspection vehicle such that the inspection vehicle moves along an inspection path to a stoppage position, or the stoppage place, of the vehicle that intends to make a departure;
- detecting an environment around the inspection vehicle at the stoppage place of the vehicle by the sensor system in the inspection vehicle while a detection zone of the at least one sensor is oriented at least in some regions at the subregion beneath the vehicle and/or at the vehicle; and
- determining, in dependence on the sensor signals generated by the sensor system, whether there is an impediment by which the departure of the vehicle is impeded or could be prevented, in order to carry out a pre-departure check.

According to an embodiment of the invention there is also provided an inspection arrangement comprising a management system and an inspection vehicle which can be controlled by the management system, wherein the management system has a corresponding management controller, so that a method according to an embodiment of the invention can be carried out by the inspection arrangement.

Advantageously, use is thus made of a mobile inspection vehicle (cf. remotely controllable vehicle) which, by means of a suitable movement along the inspection path, is purposively able to detect with its sensors the entire subregion or at least the relevant part of the subregion beneath the vehicle, that is to say between the ground and the vehicle, in order then also to be able to conclude whether there are people and/or objects beneath the vehicle which may impair a safe departure of the vehicle. However, the vehicle itself can also be detected by the mobile inspection vehicle in order to deduce therefrom whether there is a functional impairment of the vehicle. An impediment can then likewise be derived from the state of the vehicle which would impair a safe departure of the vehicle. Use is made here of the fact that the vehicle is situated on a site with a management system, that is to say certain management functions are already being carried out, and these management functions can advantageously be expanded by the operation of the inspection vehicle.

Preferably, it is thus assumed that the inspection vehicle is associated with the site of the management system and/or the inspection vehicle is able to move only on the site of the management system. The inspection vehicle can thus be integrated into the management system simply for functional expansion and is also designed for operation on the site in question. Preferably, a current position of the inspection vehicle can be monitored by the management system by means of a position detection system on the inspection vehicle as the inspection vehicle travels along the inspection path, so that purposive coordination between the inspection vehicle and the management system is possible.

Preferably, it is further provided that the sensor signals generated by the sensor system of the inspection vehicle and characterizing the environment around the inspection vehicle at the stoppage place are transmitted to the management system, preferably by way of a wireless communication system, and it is determined in the management system, in dependence on the sensor signals generated by the sensor system, whether there is an impediment by which the departure of the vehicle is impeded. Accordingly, the evaluation can thus be carried out in the management system, so that extensive computing capacity does not have to be made available in the inspection vehicle itself. Therefore, only the raw data or at least preprocessed data are to be transmitted to the management system, which then performs the part of the evaluation that is more complex in terms of computation. It can be provided in particular that the determination of whether there is an impediment by which the departure of the vehicle is impeded is carried out in the management system manually, for example by a teleoperator, or in an automated manner by an identification algorithm, or by image processing, so that, in the case of a manual evaluation, computing power can in principle also be saved in the management system.

Preferably, it is further provided that the inspection path is defined beforehand by the management system and
- the inspection path is transmitted as a control command to the inspection vehicle, or
- control commands are transmitted to the inspection vehicle such that the inspection vehicle travels along the previously defined inspection path. Better plannability is thus achieved.

Preferably, it can additionally also be provided that the inspection path can be adjusted by the management system, in particular in dependence on the sensor signals. If, for example, an obstacle is identified or something changes in the planning and coordination of the vehicles on the site, then the management system can adjust the inspection path accordingly, so that the planned movement of the inspection vehicle subsequently changes.

Preferably, it can further be provided that the inspection path of the inspection vehicle is defined in dependence on whether one or more vehicles on the site are intending to make a departure from a stoppage place, so that the inspection vehicle moves along the inspection path in succession to the stoppage positions or stoppage places of all the vehicles that are intending to make a departure, wherein the inspection path is preferably also defined in dependence on a planned departure time of the vehicle in question. Time can thus be saved, and individual inspection vehicles are not necessary for each planned departure process. The departure process can thus be optimized.

Preferably, it is further provided that the inspection vehicle has a central controller which activates a drive system and/or a steering system of the inspection vehicle in an automated manner in dependence on the at least one control command. There is therefore provided an autonomously operable inspection vehicle, which does not require a driver. In addition, it can here be provided that the central controller activates the drive system and/or the steering system of the inspection vehicle also in dependence on the sensor signals generated by the sensor system of the inspection vehicle, in particular adjusts an inspection speed of the inspection vehicle and/or the inspection path in dependence on the sensor signals. The inspection vehicle can thus itself also purposively react to obstacles or objects in the environment that are identified by the sensors when the central controller also has a corresponding image processing algorithm installed therein. The inspection vehicle can then also move out of the way or react to identified obstacles autonomously.

Preferably, it can here additionally be provided that the inspection speed of the inspection vehicle is limited to a maximum speed, wherein the maximum speed is, for example, 20 km/h, preferably 17 km/h, in particular 14 km/h, and/or is preferably defined in dependence on the environment. The risk emanating from the inspection vehicle on the site can thus be minimized because, at such low maximum speeds, it is possible to react in good time and, even in the event of a collision, severe damage does not occur.

Preferably, it is further provided that the inspection vehicle has a lighting device on a rear side and/or on a front side of the inspection vehicle for lighting the environment of the inspection vehicle, for example in darkness, so that, even then, a reliable detection of people and/or objects in the subregion or also of the state of the vehicle is possible. It is further provided, in order to improve the detection zone of the sensor system, that the at least one sensor of the sensor system is a fisheye camera, for example having a detection zone of 180° or more, wherein there are preferably provided at least two sensors which have different, preferably oppositely oriented, detection zones, for example detection zones oriented to the front side and to the rear side of the inspection vehicle. A sufficiently large region of the environment of the inspection vehicle can thus be covered, so that complex movement paths of the inspection vehicle are not necessary for detecting the entire subregion of the vehicle. In order to be able to detect the subregion sufficiently, preferably in order to be able to drive under the vehicle to be inspected, and/or in order to minimize the risk emanating from the inspection vehicle, it is further provided that an overall height of the inspection vehicle is not more than 0.5 m, in particular not more than 0.35 m, and/or a mass of the inspection vehicle is less than 10 kg, preferably less than 5 kg.

Preferably, it is further provided that the at least one control command to the inspection vehicle is generated such that the inspection vehicle, in the region of the stoppage position or at the stoppage place of the vehicle, in particular in the subregion beneath the vehicle, follows a non-linear route, for example travels along sinuous lines, for example as a result of a corresponding definition of the inspection path. It can thus be ensured that every region of the subregion, in particular also behind the wheels, and also of the vehicle itself can be detected by the sensors on the inspection vehicle.

Preferably, it is further provided that the at least one control command to the inspection vehicle is generated such that the inspection vehicle projects into the subregion beneath the vehicle and/or drives through the subregion beneath the vehicle completely, in order to orient the detection zone of the at least one sensor at the subregion beneath the vehicle, wherein this is preferably effected such that the entire subregion beneath the vehicle can be detected by the sensors of the sensor system. By correspondingly orienting and controlling the movement of the inspection vehicle, it can thus be ensured that the subregion is also detected sufficiently, wherein the inspection vehicle is also configured, on account of its overall height, to drive into the subregion itself.

Preferably, it is further provided that, in addition to the detection of a person in the subregion, a further impediment by which the departure of the vehicle is impeded is present if, on the basis of the sensor signals generated by the sensor system of the inspection vehicle, it is determined that there is in the subregion beneath the vehicle at least one object selected from the group consisting of: wheel chock beneath the wheels of the vehicle, supports of a trailer of the vehicle, a load, nails, screws, wooden boards, pallets, tarpaulins, stanchions. Such objects can impair safe and reliable departure of the vehicle and can easily be detected by the inspection vehicle with corresponding control.

Preferably, it is further provided that an impediment by which the departure of the vehicle is impeded is determined in dependence on at least one state selected from the group consisting of: lighting state, wheel state, door state, tarpaulin state, load state, weather state, braking system state, drive state, wherein the respective state is determined on the basis of the sensor signals generated by the sensor system of the inspection vehicle. It is thus possible to check not only the subregion but also the state, or functional impairments, of the respective component of the vehicle itself.

To this end, it can preferably further be provided that the state of the vehicle, in particular the braking system state and the drive state, is determined by way of an acoustic sensor of the sensor system of the inspection vehicle by evaluation of the noise that occurs in the environment around the inspection vehicle, said noise being detected at the stoppage place of the vehicle by way of the acoustic sensor. By means of acoustic monitoring, additional information can be obtained which cannot clearly be deduced by purely optical monitoring by means of the further sensors of the sensor system, for example small holes or other leaks in fluid-carrying pneumatic lines.

Preferably, it is further provided that the at least one control command is transmitted to the inspection vehicle and/or control signals for coordinating a vehicle on the site in question are transmitted by way of a wireless communication system, for example WLAN, LTE, 5G, LoraWan, etc. Simple coordination and control of the inspection vehicle and also of the vehicle within the context of the management function in question are thus possible. Preferably, it is further provided here that, when there is an impediment by which the departure of the vehicle is impeded, the management system and/or the inspection vehicle generates control signals and outputs them to the vehicle such that the vehicle is prevented from making a departure and/or is informed that there is an impediment by which the departure of the vehicle is impeded. Use is made here of the fact that the management system, by way of a first management function, is able to purposively coordinate a vehicle on the site in question and optionally also actively intervene in the operation of the vehicle, wherein this can take place directly from the management system or indirectly by way of the inspection vehicle associated with the management system. Thus, if clearance is not granted because a person and/or an object has been identified in the subregion or the state of the vehicle does not permit clearance, then the management system is able to react accordingly directly or indirectly by way of the inspection vehicle. In order to achieve this, it can especially be provided that, on the basis of the control signals, when there is an impediment, a parking brake of the vehicle is applied or remains applied and/or the vehicle is switched off.

Preferably, it is further provided that, when there is no impediment, that is to say when no person and/or no object has been detected by the inspection vehicle in the subregion, the inspection vehicle moves into a clearance area on the site, for example in front of (in the starting direction of travel) of the vehicle, wherein the vehicle is then able to detect, by means of a vehicle environment sensor system, whether the inspection vehicle is in the clearance area and thus itself determines whether the vehicle has been cleared by the management system to make a departure, wherein, in dependence on the sensor signals generated by the inspection vehicle, the presence of an impediment continues to be checked until the vehicle makes a departure and/or when the vehicle is making a departure from the stoppage place. It can thus easily be communicated to the vehicle (or to the driver of the vehicle) that the pre-departure check has had a positive result, or a departure has been cleared, without further feedback from the management system being necessary. The inspection vehicle can then also continue to observe the subregion in the clearance area at least for a short time during the departure.

Preferably, it is further provided that, when the charge level of an energy store of the inspection vehicle falls below a minimum charge level, the inspection vehicle drives independently or at the instigation of the management system to a charging station installed on the site in question. Charging at the corresponding time can thus take place automatically.

Preferably, it is further provided that, in dependence on the sensor signals of the sensor system of the inspection vehicle, the type of vehicle braking system of the vehicle, in particular of a trailer of the vehicle, is determined. Additional information which may be helpful for the safe departure of the vehicle can thus be acquired by way of the inspection vehicle, for example whether the trailer newly coupled in the stoppage area has an electronic braking system. The towing vehicle can then adjust its operation accordingly on departure.

FIG. 1 shows, in schematic form, a vehicle 1 which in the exemplary embodiment shown consists of a towing vehicle 1a and a trailer 1b. The vehicle 1 can in principle also be in one-part form and can be operated both manually and in an automated manner. The vehicle 1 is stationary at a stoppage place 10, for example in a parking place, on a loading ramp, at a fuel pump, etc. The stoppage place 10 can be situated on a public site 11a, for example at a service area or a fuel station, or on a closed site 11b, for example a port area or at a depot.

The stoppage place 10 lies within a range of influence 12 of a management system V, wherein the management system V is configured to monitor and also to coordinate the activities of vehicles 1 within the range of influence 12, wherein certain management functions F can to that end be performed under the control of the management system V, in particular a management controller 80. Monitoring and coordination here optionally take place in coordination with a fleet operator or a fleet management system, wherein the management system V described here can also be integrated in the fleet management system or be part thereof. By way of the management system V, the arrival, the stay, or processing, and the departure A of the vehicle 1 on the site 11a, 11b can be planned or coordinated in terms of time and location. The site 11a, 11b in question preferably also has a site environment sensor system 11c with which the management system V is able to detect the site 11a, 11b, in particular in the range of influence 12, with different types of sensor, in particular a camera.

The management system V is able, within the range of influence 12, to communicate with a vehicle 1, in particular by way of a wireless communication system 4, for example WLAN, LTE, 5G, LoraWan, etc. To this end, information relating to the vehicle 1 can be exchanged and certain control functions of the vehicle 1 can be performed, in particular when the vehicle 1 is or can be driven autonomously or semi-autonomously. There can thus be specified to the vehicle 1, for example, a path on the site 11a, 11b in question on which the vehicle should/may move to a target point, or other instructions relating to the tasks to be performed or the authorizations on the site 11a, 11b in question. The management system V is thus able to purposively influence the operation of the vehicle 1 in a certain way, which constitutes a first management function F1, wherein this can take place by the provision of information to a driver (where present) and/or by active intervention in a vehicle controller 5.

Figure 2:
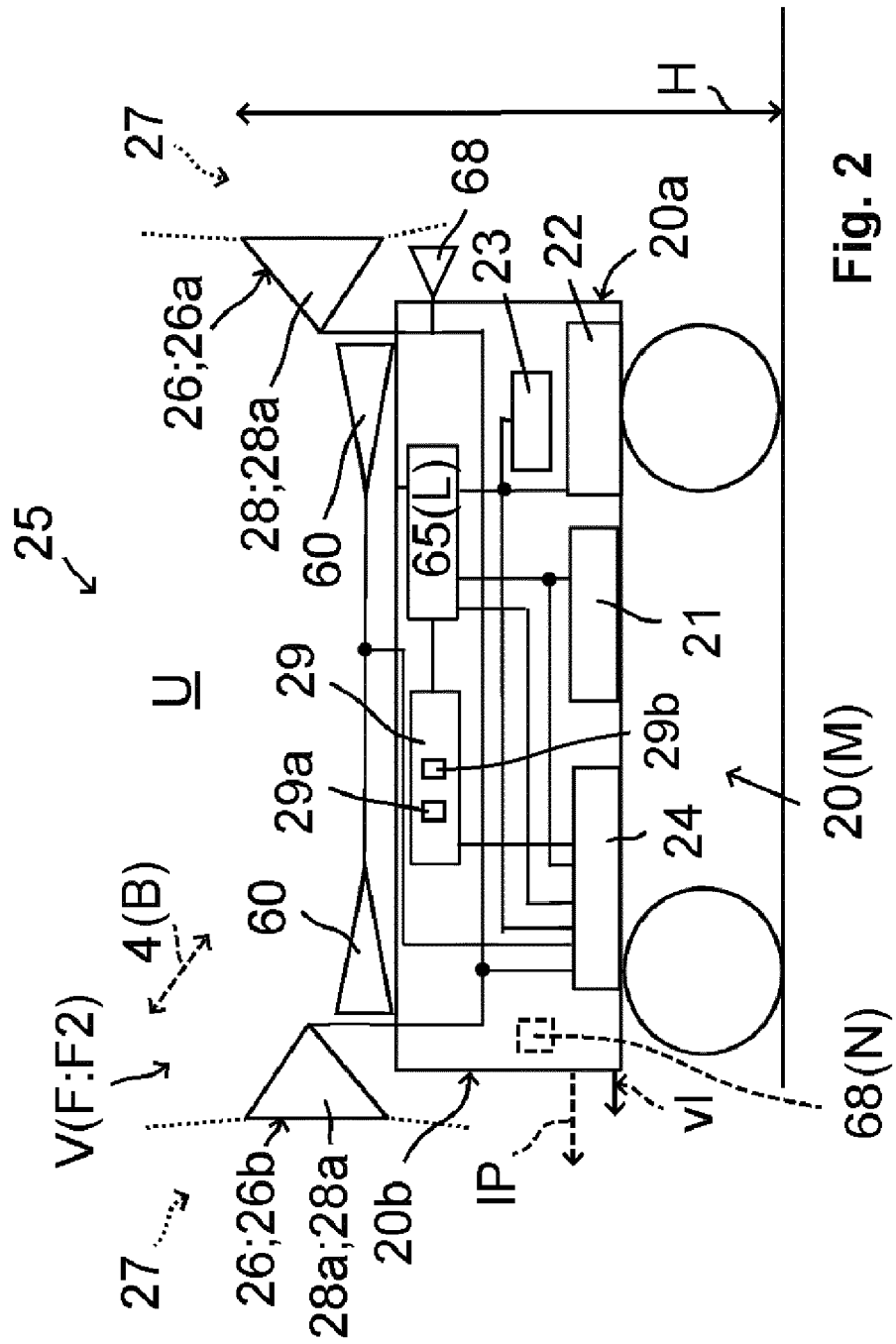
FIG. 2 illustrates a schematic view of an inspection vehicle.

A second management function F2 of the management system V is to assume control of an inspection vehicle 20 which is or can be controlled in an automated manner and which has a drive system 21, a steering system 22 and optionally also a braking system 23, as shown in highly schematic form in FIG. 2. To this end, the management system V can transmit control commands B, by way of the wireless communication system 4, to a central controller 24 of the inspection vehicle 20, said commands then being processed by the central controller 24 of the inspection vehicle 20 and transmitted to the corresponding systems 21, 22, 23, so that the inspection vehicle 20 moves on the site 11a, 11b in question along a predetermined inspection path IP. Preferably, the inspection path IP is defined in the management system V.

It is here possible either that the inspection path IP is transmitted directly as a control command B to the central controller 24 of the inspection vehicle 20, the inspection vehicle 20 then traveling autonomously, or independently, along the inspection path, or that the control commands B contain braking and/or steering and/or drive instructions for the respective systems 21, 22, 23 which have been specified (manually or in an automated manner) by the management system V and on the basis of which the inspection vehicle 20 follows the predetermined inspection path IP.

The inspection vehicle 20 controlled by the management system V serves to perform certain checking tasks, in particular to ensure, prior to the departure A of a vehicle 1 from the stoppage place 10, that there are no people 30 and/or objects 40 in a subregion 6 beneath the vehicle 1, that is to say beneath the towing vehicle 1a or the trailer 1b, or to check generally whether there are impediments G which prevent or impede the departure A of the vehicle 1. Therefore, the second management function F2 of the management system V allows a vehicle 1 on the site 11a, 11b in question to be monitored or inspected, whereupon the management system V can then again influence the operation of the vehicle 1 within the context of the first management function F1. For example, the management system V can prevent the vehicle 1 from beginning its journey if an impediment G has been determined by means of the inspection vehicle 20.

A pre-departure check AK can thus be carried out by way of the two described management functions F1, F2 and optionally further management functions F, wherein, if there is an impediment G, the departure A of the vehicle 1 is automatically prevented by the generation and transmission of a control signal S1 to the vehicle 1 by the first management function F1 of the management system V. The corresponding control signal S1 is normally transmitted directly from the management controller 80 of the management system V to the vehicle 1 by way of the wireless communication system 4. Alternatively, however, it can also be provided that the control signal S1 is generated and/or transmitted to the vehicle 1 by way of the wireless communication system 4 from the inspection vehicle 20 in coordination with the management system V.

The control signal S1 is correspondingly processed by the vehicle controller 5 of the vehicle 1 and application of a parking brake 7 of the vehicle 1 or of other braking means of the vehicle 1 is then initiated, for example, so that the vehicle 1 is actively impeded from making a departure A. However, within the context of the first management function F1 or further management functions F, equivalent alternatives are also possible which can impede the vehicle 1 from departing if an impediment G has been determined by means of the inspection vehicle 20 in the context of the second management function F2, for example also that the vehicle 1 is switched off.

In addition to a person 30, for example checking staff, in the subregion 6, there come into consideration as an impediment G which impairs safe departure A of the vehicle 1 also an object 40 in the subregion 6, for example wheel chocks 40$a$ beneath the wheels 8 of the vehicle 1, wherein it can be checked by means of the inspection vehicle 20 whether these have actually been removed prior to departure A. Further objects 40 which can be identified by the inspection vehicle 20 are also supports 40$b$ of the trailer 1$b$ (in particular semi-trailer), which, for example, have not yet been raised and therefore project into the subregion 6 and prevent safe departure A of the vehicle 1. Further objects 40 located in or projecting into the subregion 6 can also constitute an impediment G to departure A, for example a load 40$c$, nails 40$d$, screws 40$e$, wooden boards 40$f$, pallets 40$g$, tarpaulins 40$h$, stanchions 40$i$, etc.

A further impediment G to a safe departure A can, however, also come about in dependence on a state Z of the vehicle 1, which can likewise be determined by way of the sensors 26 of the sensor system 25 of the inspection vehicle 20, that is to say the functional capability or a functional impairment of the vehicle 1 is assessed by way of the sensors 26 on the inspection vehicle 20. To this end, a lighting state Z1 of a lighting system 1$f$ of the vehicle 1 can be checked by means of the inspection vehicle 20 by evaluation of the sensor signals S2. For this purpose, the management system V and/or the inspection vehicle 20 can correspondingly activate the lighting system 1$f$ of the vehicle 1 by way of the vehicle access (first management function F1 or control signal S1) and thus connect through each individual light (indicators, brake light, dipped headlight, rear light, etc.). A wheel state Z2 of the wheels 8 of the vehicle 1 can also be checked in dependence on the sensor signals S2 when the inspection vehicle 20 is driven correspondingly close to the wheels. In the event that the wheel state Z2 is inadequate, which can also be the case, for example, if wheels 8 are missing/have been removed, it can be concluded that there is an impediment G. There can further be checked a door state Z3, that is to say a (half-)open or a closed door, or a tarpaulin state Z4 (defective, open/closed) or a load state Z5 of the load of the vehicle 1 or a weather state Z6, which indicates whether there is, for example, excessive snow or water on the vehicle 1 (or around the vehicle 1).

All these impediments G, which arise because there is a person 30 in the subregion 6 and/or an object 40 in the subregion 6 and/or because of a state Z of the vehicle 1, are to be determined according to embodiments of the invention by way of the inspection vehicle 20, which moves, as a result of the control commands B specified by the management system V, on a specific inspection path IP on the site 11$a$, 11$b$ in question, wherein the inspection path IP is preferably defined such that, generally, the environment U in the region of the stoppage place 10, in particular the vehicle 1 itself, and also the entire subregion 6 beneath the vehicle 1, can be imaged or detected. To this end, the inspection vehicle 20 is provided with a sensor system 25 which has at least one sensor 26 having a detection zone 27 in which it can detect the environment U around the inspection vehicle 20. Accordingly, sensor signals S2 which characterize the environment U in the detection zone 27 can then be generated and/or processed by the sensor system 26. By way of the wireless communication system 4, these sensor signals S2 can correspondingly be transmitted as raw data or in (pre) processed form to the management system V for further processing and/or evaluation.

To this end, the at least one sensor 26 can be, for example, a camera 28, in particular a fisheye camera 28$a$, with which it is possible to detect the environment U in a detection zone 27 of up to 180° with only a single sensor 26, or only a single fisheye camera 28$a$. In principle, it is also possible to provide more than one sensor 26, in particular a first sensor 26$a$, for example on a rear side 20$a$ of the inspection vehicle 20, and a second sensor 26$b$, for example on a front side 20$b$ of the inspection vehicle 20, both of which sensors can in turn be in the form of fisheye cameras 28$a$. The two sensors 26$a$, 26$b$ are then oriented differently, so that a wide region of the environment U around the inspection vehicle 20 can be covered by their respective detection zones 27. By processing and/or evaluating the sensor signals S2 so generated, a comprehensive image of the environment U can therefore be monitored or checked.

In order to check the state Z of the vehicle 1, an acoustic sensor 68, for example a microphone, can also be installed on the inspection vehicle 20 as a further sensor 26 of the sensor system 25. By evaluating the sensor signals S2 generated by the acoustic sensor 68, noise N in the environment U around the inspection vehicle 20 can be identified and it can be checked whether, for example, air is escaping from the (pneumatic) vehicle braking system 1$d$ of the vehicle 1, whereby a braking system state Z7 can additionally be checked. Moreover, engine noise of the drive system of the vehicle 1 can be analyzed and it can be determined whether such noise is normal, whereby a drive state Z8 can also be checked. The noise N can be detected over the entire length of the vehicle 1, that is to say at the towing vehicle 1$a$ and also at the trailer(s) 1$b$, in order thus to locate where the leak or a defect occurs.

In order to be able to generate or record a sufficiently large or sufficiently detailed image of the entire subregion 6 beneath the vehicle 1 by means of this sensor system 25 in the inspection vehicle 20, the inspection vehicle 20 is so dimensioned, in terms of its overall height H, that it can drive under the vehicle 1 to be inspected. Thus, by correspondingly choosing the inspection path IP, all regions beneath the vehicle 1, including regions which are covered by the wheels 8, for example, which in some circumstances are visually accessible from the side of the vehicle 1 only with difficulty, can be detected by way of the at least one sensor 26. Furthermore, the wheels 8 themselves can thus also be detected with a high resolution from different directions, in order also to be able to evaluate the wheel state Z2 of the wheels 8 in the context of the pre-departure check AK. The recording of noise N by way of the acoustic sensor 68 is thus also made possible from beneath the vehicle 1.

In order to achieve this, an overall height H of the inspection vehicle 20 of not more than 0.5 m, preferably of not more than 0.35 m, is provided, so that the inspection vehicle does get caught on substructure parts in the subregion 6 beneath the vehicle 1. The sensors 26 are mounted correspondingly low on the inspection vehicle 20, so that they do not take up any additional installation space at the top. In order to travel along the inspection path IP in an accurately positioned manner, there can be installed on the inspection vehicle 20, in addition to the sensor system 25, a position detection system 29, for example having a GPS sensor 29a and/or a LIDAR sensor 29b, wherein an RTK (real time kinematic) measurement can optionally also be provided in order to increase the accuracy.

In order likewise to record an image of the environment U in darkness, a lighting device 60 is installed on the rear and/or front side 20a, 20b of the inspection vehicle 20. The lighting device 60 can have, for example, one or more LEDs with low power consumption.

Because the inspection vehicle 20 is used merely for inspecting or checking the environment U and therefore has only a small number of components, a mass M of the inspection vehicle 20 of less than 5 kg, preferably less than 3 kg, is provided, so that it can safely be operated at inspection speeds vI of up to 20 km/h and is also very maneuverable because of its small size. Traveling along the inspection path IP can thus take place very quickly and on any desired inspection paths IP, so that an inspection is not very complex and also takes place with little disruption during operation on the site 11a, 11b. Even if, despite the precautionary measures, a collision should occur between the inspection vehicle 20 and a person 30, no or only a relatively small risk emanates therefrom because of the low weight M of the inspection vehicle 20. In addition, it can also be provided that the inspection speed vI is limited to a maximum speed vMax of 20 km/h, preferably 17 km/h, in particular 14 km/h, wherein the maximum speed vMax can also be determined in dependence on the environment U in question, or the site 11a, 11b in question. The risk emanating from the inspection vehicle 20 is thus reduced further.

Figure 3:
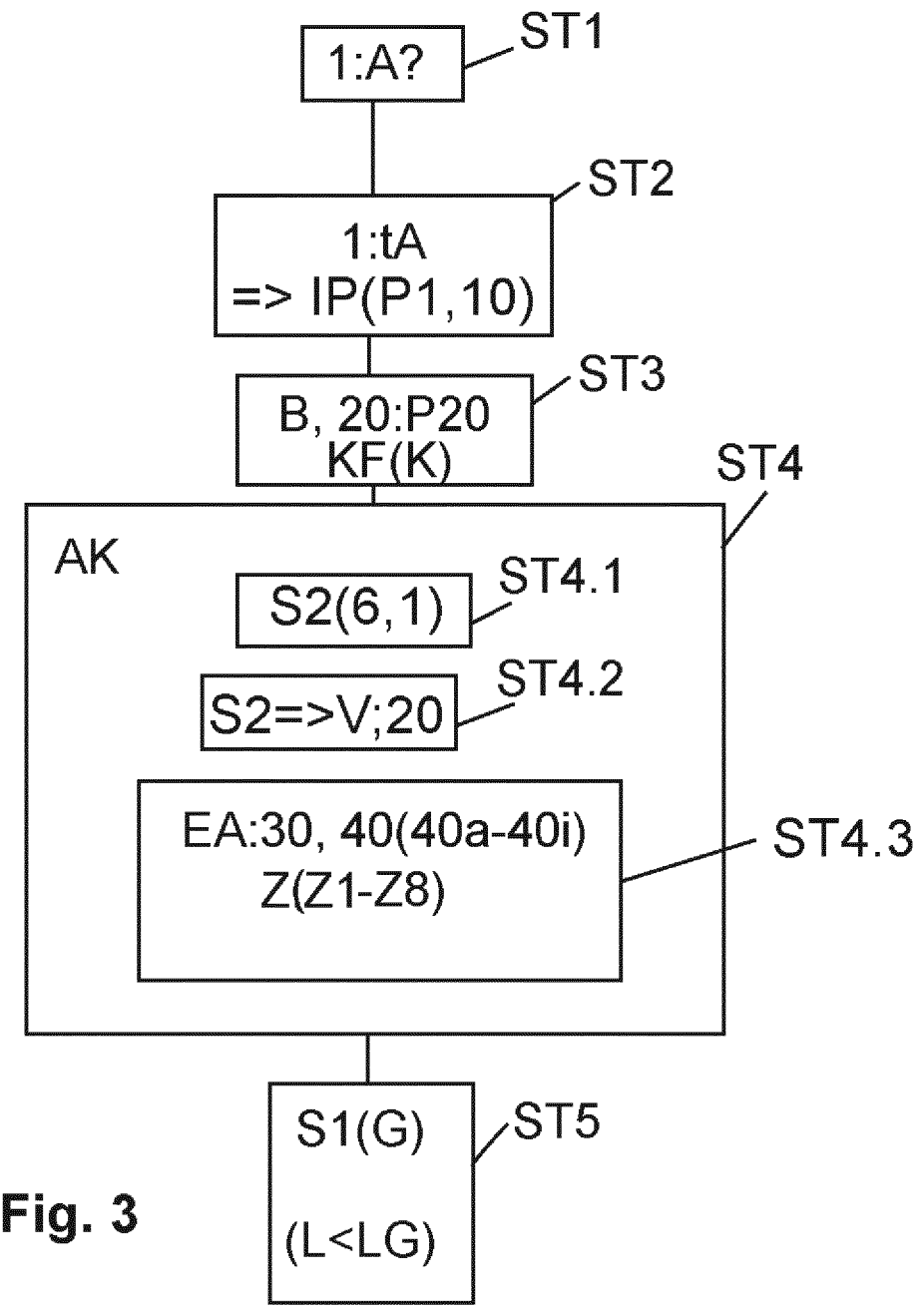
FIG. 3 illustrates a flow diagram of a method according to an embodiment of the present invention.

With this inspection system 100 comprising the management system V with the management controller 80 and the inspection vehicle 20 which can be controlled thereby, the following procedure, which is shown by way of example in FIG. 3 in a flow diagram, for inspecting the vehicle 1 within the context of a pre-departure check AK can be carried out:

In an initial step ST1, the management system V first determines whether at least one of the vehicles 1 on the site 11a, 11b in question is ready to depart and intends to depart from the stoppage place 10. Because the management system V undertakes coordination on the site 11a, 11b in question, it is correspondingly also informed of every intended departure A, or readiness to depart. It is here assumed that a vehicle environment sensor system 1c on the particular vehicle 1 that is ready to depart was optionally deenergized when the vehicle 1 was in the stopped state and the vehicle 1 itself was therefore unable to detect whether something has got under the vehicle 1 or an inspecting person 30 or another interfering object 40 is still beneath the vehicle 1 or whether a state Z of the vehicle 1 that impedes the departure A of the vehicle 1 is present. On the site 11a, 11b in question, such monitoring thus cannot be provided by the vehicle 1, or the vehicle environment sensor system 1c thereof, because the vehicles 1 are in some circumstances stopped for a relatively long time and are thus switched off, so that the vehicle environment sensor system 1c itself can also no longer be permanently active.

In a second step ST2, the management system V determines an inspection path IP in dependence on a stopped position P1 of the vehicle 1 with the intention to make a departure A, wherein the stopped position P1 of the vehicle 1 is known to the management system V, for example from wirelessly transmitted information from the vehicle 1 itself and/or by way of the site environment sensor system 11c installed on the site 11a, 11b. When determining the inspection path IP of the inspection vehicle 20, account can also be taken of whether multiple vehicles 1 on the site 11a, 11b in question are intending to make a departure A, so that multiple vehicles 1 that are ready to depart can be monitored or inspected by only one inspection vehicle 20 by way of the inspection path IP. When defining the inspection path IP, a prioritization of one of the vehicles 1 in dependence on a planned departure time tA of the vehicle 1 in question can also play a part.

In a third step ST3, a movement of the inspection vehicle 20 is initiated by the outputting of the corresponding control command(s) B by the management system V to the inspection vehicle 20, the inspection vehicle then traveling along the inspection path IP and thereby being directed to the particular vehicle 1 that is ready to depart. By way of the position detection system 29, the management system V can accurately determine or monitor a current position P20 of the inspection vehicle 20 and therefore check the automated journey, so that precise control of the inspection vehicle 20 is possible, optionally with the additional use of an RTK measurement, if available.

Basic information about the environment U around the inspection vehicle 20 can optionally be acquired by means of the sensor(s) 26 of the sensor system 25 of the inspection vehicle 20, in particular by means of the cameras 28 by means of image processing algorithms, in order to allow obstacles that are not known to the management system V and/or that are not detectable by way of the site environment sensor system 11c to be avoided and/or in order to effect a reduction in the inspection speed vI of the inspection vehicle 20 if unknown moving objects or unknown obstacles are identified in the environment U. To this end, the central controller 24 either receives corresponding control commands B from the management system V, for example for adjustment of the inspection path IP or for a temporary deviation from the predetermined inspection path IP, or itself initiates a correction to the inspection path IP on the basis of the sensor signals S2.

A mapping function KF can additionally be carried out while the inspection vehicle is traveling along the inspection path IP, in which the sensor signals S2 generated and outputted by the inspection vehicle 20 and also the current position P20 of the inspection vehicle 20, which is determined by way of the position detection system 29, are evaluated, for example at the management controller 80. Stored map data K, which the management system V uses for coordinating the vehicles 1 and also for controlling the inspection vehicle 20 on the site 11a, 11b in question, can thus be validated and, if necessary, also adjusted. The map data K can thus be maintained at a current status if, for example, the site 11a, 11b in question cannot be surveyed fully by the site environment sensor system 11c. By means of the sensor signals S2 from the inspection vehicle 20 and the current position P20 of the inspection vehicle 20, information gaps can thus be filled, or changes in the environment U or on the site 11a, 11b in question can be identified.

If the inspection vehicle 20 has arrived at the vehicle 1 that is ready to depart, a pre-departure check AK is carried out in a fourth step ST4 by scanning in particular of the subregion 6 beneath the vehicle 1 in question for people 30 and/or objects 40. The inspection vehicle 20 here also drives (at least partially) under the vehicle 1 that is ready to depart and that is to be checked and in a first sub-step ST4.1 generates corresponding sensor signals S2 which characterize the subregion 6 beneath the vehicle 1. To this end, the inspection path IP is preferably defined in such a manner that the inspection vehicle 20 travels along a non-linear route, for example along gentle sinuous lines S, in the subregion 6 beneath the vehicle 1 so that it can reliably record also the regions between the wheels 8 on the vehicle axles of the vehicle 1 by means of the at least one sensor 26. The sinuous lines S, or the non-linear route, especially facilitate the design of the sensor system 25 with only one sensor 26, in particular with only one camera 28 (fisheye camera 28a), because, owing to the non-linear route or the sinuous lines S, the region beneath the vehicle 1 that is detected over time increases, regardless of the actual size of the detection zone 27 of the sensor 26 in question.

Within the context of the pre-departure check AK, however, the inspection vehicle 20 moves at the stoppage place 10 of the vehicle 1 in question not only such that the subregion 6 beneath the vehicle 1 lies within the detection zone 27 of the particular sensor 26 on the inspection vehicle 20, but also such that the vehicle 1 itself can be detected or scanned over as large an area as possible in order to allow the state Z of the vehicle 1 itself to be determined or checked. To this end, the inspection path IP is correspondingly defined and traveled along optionally with a non-linear route. Sensor signals S2 from which a state Z of the vehicle 1 can be derived are therefore also generated.

In a second sub-step ST4.2, the sensor signals S2 generated by the sensor(s) 26 are transmitted preferably in unprocessed or only preprocessed form to the management system V by way of the wireless communication system 4. Preferably, the sensor signals S2 are not subjected to comprehensive (pre)processing at the inspection vehicle 20 itself. Computing capacity and space in the inspection vehicle 20 can thus be saved.

In a third sub-step ST4.3, it is determined by way of an identification algorithm EA in the management system V, on the basis of the sensor signals S2 generated in the inspection vehicle 20, whether people 30 and/or objects 40, for example wheel chocks 40a, supports 40b, load 40c, nails 40d, screws 40e, wooden boards 40f, pallets 40g, tarpaulins 40h, stanchions 40i, etc., are situated in or projecting into the subregion 6 of the vehicle 1. If a person 30 and/or an object 40 is identified in the subregion 6 of the vehicle 1 that is ready to depart, an impediment G is derived therefrom. Furthermore, by way of the identification algorithm EA or a teleoperator, at least one of the above-mentioned states Z; Z1-Z8 of the vehicle 1, and thus whether there is an impediment G, can be checked or derived from the sensor signals S2 generated in the inspection vehicle 20. For example, the functioning and correct setting of each individual light of the lighting system 1f can be checked by way of the identification algorithm EA or the teleoperator, after or during activation of each light in a correspondingly controlled manner by the management system V and/or by the inspection vehicle 20 by way of the control signal S1. Further functional tests and corresponding monitoring of the ensuing reaction or of the lack of a reaction of the vehicle 1 can also be provided by way of the sensors 26 on the inspection vehicle 20.

The evaluation of the sensor signals S2 (optical sensors and/or acoustic sensors) can, however, in principle also be carried out by way of the identification algorithm EA in the inspection vehicle 20 itself, provided that the infrastructure is present in the inspection vehicle 20. Sub-steps ST4.2 and ST4.3 are then adapted accordingly.

The evaluation of the sensor signals S2 can also be carried out at least in part manually, for example by means of a person as the teleoperator of the management system V, instead of by way of the identification algorithm EA. Said person can likewise determine an impediment G on the basis of the sensor signals S2. The teleoperator can also control the inspection vehicle 20 manually if required and for this purpose specify corresponding control commands B for transmission to the inspection vehicle 20.

In a fifth step ST5, clearance for a departure A of the vehicle 1 in question is or is not granted depending on the presence of an impediment G. If a person 30 and/or an object 40 is detected by the identification algorithm EA (or the teleoperator), or the presence of some other impediment G is determined in dependence on the detected state Z of the vehicle 1, clearance for a departure A of the vehicle 1 from the site 11a, 11b in question is not granted, that is to say a safe departure state is not determined by the management system V (or by the inspection vehicle 20) within the context of the pre-departure check AK. This can be expressed by a corresponding application of the first management function F1. The vehicle 1 is thus prevented from departing by the management system V and/or by the inspection vehicle 20 by way of the wireless communication system 4 by the provision of information and/or by an active intervention in the vehicle controller 5, for example by application of the parking brake 7/leaving the parking brake applied and/or by switching off the vehicle 1. Clearance is then granted, for example, only when the person 30 and/or the object 40 is no longer in the subregion 6 and/or the state Z of the vehicle 1 that is preventing departure A has been eliminated.

The impediment G can be eliminated by carrying out the method again, that is to say by defining and traveling along the inspection path IP again and scanning the subregion 6 or the vehicle 1 at the stoppage place 10 by the inspection vehicle 20 in the mentioned steps of the method, or by manually quitting the impediment G, whereupon further impediments G can be checked by the inspection vehicle 20.

If it is determined in the fifth step ST5 that there is no impediment G and/or that the impediment has been eliminated, clearance is granted and the vehicle 1 is informed thereof or is no longer prevented by the first management function F1 from making a departure A from the stoppage place 10 on the site 11a, 11b in question. This can take place, for example, in that the inspection vehicle 20, when there is no impediment G, drives into a clearance area 50, for example in front of (in the starting direction of travel) of the vehicle 1. The vehicle 1, by means of the vehicle environment sensor system 1c, detects the inspection vehicle 20 in this clearance area 50 and can automatically conclude therefrom that it can begin its journey. If the inspection vehicle 20 has a sensor 26 on its rear side 20a, it can additionally be ruled out that something has made its way into the blind spot (which is not detectable by the vehicle environment sensor system 1c) in front of or behind the vehicle 1 after the described pre-departure check AK or clearance. Once the vehicle 1 that is ready to depart has begun to move away, the blind spot is overcome and the inspection vehicle 20 can check the next vehicle 1 or follow the inspection path IP back to the parking position of the inspection vehicle 20.

When an energy store 65 of the inspection vehicle 20, which serves to operate the inspection vehicle 20, is empty and/or a charge level L falls below a predetermined minimum charge level LG, the inspection vehicle is configured to automatically drive to a charging station 66 installed at the site 11a, 11b in question. This can be checked, for example, in or after the fifth step ST5, that is to say after every inspection. If it is determined by the management system V that there is no pending inspection of one of the vehicles 1 in the near future, the inspection vehicle 20 can be driven to the charging station 66 even at a minimum charge level LG of, for example, below 50% in order to charge the energy store 65 independently.

The disclosed embodiments serve primarily not only for checking a state, that is to say evaluating a state Z of the subfloor or the exhaust system or other components of the vehicle 1, in order to determine a defect or an inoperable state or a functional impairment at the vehicle 1. Rather, it is actively to be evaluated by the method according to an embodiment of the invention, within the context of a pre-departure check AK, whether a safe departure A of the vehicle 1 is prevented by a person 30 and/or an object 40 and/or by a particular state Z of the vehicle 1, wherein, in particular in the case of an autonomously operated vehicle 1, this cannot reliably be determined in any other way from the or by the vehicle 1 itself.

In addition, it can be provided that, by evaluating the sensor signals S2 of the sensor system 25, a type R of the vehicle braking system 1*d* is determined. It is thus possible to identify, by means of the sensor system 25 on the inspection vehicle 20, whether an electronic braking system 1*e*, for example an ABS/EBS system, is installed in the trailer 1*b* as part of the vehicle braking system 1*d*. The management system V can then transmit this information to the towing vehicle 1*a*, for example, so that the towing vehicle is advised thereof and is able to activate the trailer 1*b* accordingly.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1 vehicle
1*a* towing vehicle
1*b* trailer
1*c* vehicle environment sensor system
1*d* vehicle braking system
1*e* electronic braking system
1*f* lighting system
4 wireless communication system
5 vehicle controller
6 subregion beneath the vehicle 1
7 parking brake of the vehicle 1
8 wheels of the vehicle 1
10 stoppage place
11*a* public site
11*b* closed site
11*c* site environment sensor system
12 range of influence
20 inspection vehicle
20*a* rear side of the inspection vehicle 20
20*b* front side of the inspection vehicle 20
21 drive system of the inspection vehicle 20
22 steering system of the inspection vehicle 20
23 braking system of the inspection vehicle 20
24 central controller of the inspection vehicle 20
25 sensor system
26 sensor
26*a* first sensor
26*b* second sensor
27 detection zone
28 camera
28*a* fisheye camera
29 position detection system
29*a* GPS sensor
29*b* LIDAR sensor
30 people
40 object
40*a* wheel chock
40*b* support of the trailer 1*b*
40*c* load
40*d* nails
40*e* screws
40*f* wooden boards
40*g* pallets
40*h* tarpaulins
40*i* stanchions
50 clearance area
60 lighting device
65 energy store
66 charging station
68 acoustic sensor
80 management controller
100 inspection system
A departure
AK pre-departure check
B control command
EA identification algorithm
F management functions
F1 first management function
F2 second management function
G impediment
H overall height of the inspection vehicle 20
IP inspection path
K map data
KF mapping function
L charge level
LG minimum charge level
M mass of the inspection vehicle 20
N noise
P1 stoppage position
P20 current position of the inspection vehicle 20

R type of vehicle braking system 1d
S sinuous lines
S1 control signal
S2 sensor signal
tA departure time
U environment
V management system
vI inspection speed
vMax maximum inspection speed
Z state
Z1 lighting state
Z2 wheel state
Z3 door state
Z4 tarpaulin state
Z5 load state
Z6 weather state
Z7 braking system state
Z8 drive state
ST1, ST2, ST3, ST4.1, ST4.2, ST4.3, ST5 steps of the method

The invention claimed is:

1. A method for inspecting a vehicle on a site with a management system, wherein the management system is configured to coordinate vehicles on the site by at least one management function, wherein the management system is further configured to control an inspection vehicle, wherein the inspection vehicle has a sensor system having at least one sensor for outputting sensor signals in dependence on an environment detected by the at least one sensor, the method comprising:
   determining whether at least one vehicle on the site intends to make a departure from a stoppage place;
   generating at least one control command by the management system and transmitting the at least one control command to the inspection vehicle such that the inspection vehicle moves along an inspection path to the stoppage place of the vehicle that intends to make the departure;
   detecting an environment around the inspection vehicle at the stoppage place of the vehicle by the sensor system in the inspection vehicle while a detection zone of the at least one sensor is oriented at least in some regions at a subregion beneath the vehicle and/or at the vehicle; and
   determining, in dependence on the sensor signals generated by the sensor system, whether there is an impediment by which the departure of the vehicle is impeded, in order to carry out a pre-departure check.

2. The method as claimed in claim 1, wherein the sensor signals generated by the sensor system of the inspection vehicle and characterizing the environment around the inspection vehicle at the stoppage place are transmitted to the management system, and it is determined in the management system, in dependence on the sensor signals generated by the sensor system, whether there is an impediment by which the departure of the vehicle is impeded.

3. The method as claimed in claim 2, wherein the determination of whether there is an impediment by which the departure of the vehicle is impeded is carried out in the management system manually or in an automated manner by an identification algorithm.

4. The method as claimed in claim 1, wherein the inspection path is defined beforehand by the management system and;
   the inspection path is transmitted as a control command to the inspection vehicle, or
   control commands are transmitted to the inspection vehicle such that the inspection vehicle travels along the previously defined inspection path.

5. The method as claimed in claim 4, wherein the inspection path can be adjusted by the management system in dependence on the sensor signals.

6. The method as claimed in claim 4, wherein the inspection path of the inspection vehicle is defined in dependence on whether one or more vehicles on the site are intending to make a respective departure from a respective stoppage place, so that the inspection vehicle moves along the inspection path in succession to the stoppage places of all the one or more vehicles that are intending to make a respective departure.

7. The method as claimed in claim 1, wherein the inspection vehicle has a central controller which activates a drive system and/or a steering system of the inspection vehicle in an automated manner in dependence on the at least one control command.

8. The method as claimed in claim 7, wherein the central controller activates the drive system and/or the steering system of the inspection vehicle also in dependence on the sensor signals generated by the sensor system of the inspection vehicle and adjusts an inspection speed of the inspection vehicle and/or the inspection path in dependence on the sensor signals.

9. The method as claimed in claim 8, wherein the inspection speed of the inspection vehicle is limited to a maximum speed, wherein the maximum speed is, 20 km/h.

10. The method as claimed in claim 1, wherein the at least one control command is generated such that the inspection vehicle, at the stoppage place of the vehicle, travels along a non-linear route, for example along sinuous lines.

11. The method as claimed in claim 1, wherein the at least one control command is generated such that the inspection vehicle projects into a subregion beneath the vehicle completely and/or drives through the subregion beneath the vehicle in order to orient the detection zone of the at least one sensor at the subregion beneath the vehicle.

12. The method as claimed in claim 11, wherein the at least one control command is generated such that the entire subregion beneath the vehicle is detected by the sensors of the sensor system.

13. The method as claimed in claim 11, wherein there is an impediment by which the departure of the vehicle is impeded if, on the basis of the sensor signals generated by the sensor system of the inspection vehicle, it is determined that there is, in the subregion of the vehicle, a person and/or at least one object selected from the group consisting of: a wheel chock beneath a wheel of the vehicle, a support of a trailer of the vehicle, a load, a nails, a screws, a wooden boards, a pallets, a tarpaulins, and a stanchions.

14. The method as claimed in claim 1, wherein the impediment by which the departure of the vehicle is impeded is determined in dependence on at least one state selected from the group consisting of: lighting state, wheel state, door state, tarpaulin state, load state, weather state, braking system state, and drive state,
   wherein the at least one state is determined on the basis of the sensor signals generated by the sensor system of the inspection vehicle.

15. The method as claimed in claim 14, wherein the state of the vehicle is determined by way of an acoustic sensor of the sensor system of the inspection vehicle by evaluation of noise that occurs in the environment around the inspection vehicle, the noise being detected at the stoppage place of the vehicle by way of the acoustic sensor.

16. The method as claimed in claim 1, wherein, when the impediment by which the departure of the vehicle is impeded is detected, the management system and/or the inspection vehicle generates control signals and outputs them to the vehicle such that the vehicle is prevented from making the departure and/or is informed of the impediment by which the departure of the vehicle is impeded.

17. The method as claimed in claim 16, wherein, on the basis of the control signals, when the impediment is detected, a parking brake of the vehicle is applied or remains applied and/or the vehicle is switched off.

18. The method as claimed in claim 1, wherein, when there is no impediment, the inspection vehicle moves into a clearance area on the site,
  wherein the vehicle detects, by a vehicle environment sensor system, whether the inspection vehicle is in the clearance area and thus determines whether the vehicle has been cleared by the management system to make the departure,
  wherein, in dependence on the sensor signals generated by the inspection vehicle, the presence of an impediment continues to be checked until the vehicle makes the departure and/or when the vehicle is making the departure from the stoppage place.

19. The method as claimed in claim 1, wherein, when a charge level of an energy store of the inspection vehicle falls below a minimum charge level, the inspection vehicle drives independently and or at the instigation of the management system to a charging station installed on the site.

20. The method as claimed in claim 1, wherein, in dependence on the sensor signals of the sensor system of the inspection vehicle, a type of vehicle braking system of a trailer of the vehicle, is determined.

21. The method as claimed in claim 1, wherein the inspection vehicle is associated with the site of the management system and/or the inspection vehicle is configured to move only on the site of the management system.

22. The method as claimed in claim 1, wherein a current position of the inspection vehicle is monitored by the management system by a position detection system on the inspection vehicle as the inspection vehicle travels along the inspection path.

23. The method as claimed in claim 22, wherein, as the inspection vehicle travels along the inspection path, a mapping function is carried out, in which map data stored in the management system is validated and/or checked in dependence on the current position and on the sensor signals generated by the sensor system in the inspection vehicle.

24. An inspection arrangement comprising a management system and an inspection vehicle which can be controlled by the management system, wherein the management system has a management controller which is configured to coordinate vehicles on a site by at least one management function, wherein the inspection vehicle has a sensor system having at least one sensor for outputting sensor signals in dependence on an environment detected by the at least one sensor, wherein the management controller is further configured to:
  determine whether at least one vehicle on the site intends to make a departure from a stoppage place;
  generate at least one control command and to transmit the at least one control command to the inspection vehicle such that the inspection vehicle moves along an inspection path to the stoppage place of the vehicle that intends to make the departure, so that the sensor system in the inspection vehicle is able to detect an environment around the inspection vehicle, while a detection zone of the at least one sensor is oriented at least in some regions at a subregion beneath the vehicle and/or at the vehicle; and
  determine, in dependence on the sensor signals generated by the sensor system of the inspection vehicle, whether there is an impediment by which the departure of the vehicle is impeded, in order to carry out a pre-departure check.

25. The inspection arrangement as claimed in claim 24, wherein a lighting device is arranged on a rear side and/or on a front side of the inspection vehicle for lighting the environment of the inspection vehicle.

26. The inspection arrangement as claimed in claim 24, wherein the at least one sensor of the sensor system is a fisheye camera.

27. The inspection arrangement as claimed in claim 24, wherein an overall height of the inspection vehicle is not more than 0.5 m, and/or a mass of the inspection vehicle is less than 10 kg.

* * * * *